(12) United States Patent
Lim et al.

(10) Patent No.: US 6,798,596 B2
(45) Date of Patent: Sep. 28, 2004

(54) METHOD AND APPARATUS FOR DETERMINING DATA FIELD FILL-IN FREQUENCY AT SERVO PACK WRITING

(75) Inventors: Eng Hock Lim, Singapore (SG); Quek Leong Choo, Singapore (SG); Kok Leong Loh, Singapore (SG); Myint Ngwe, Singapore (SG); Kah Liang Gan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 172 days.

(21) Appl. No.: 09/995,275

(22) Filed: Nov. 27, 2001

(65) Prior Publication Data

US 2003/0011921 A1 Jan. 16, 2003

Related U.S. Application Data

(60) Provisional application No. 60/286,805, filed on Apr. 26, 2001.

(51) Int. Cl.[7] .............................................. G11B 5/09
(52) U.S. Cl. .............................. 360/53; 360/48; 360/31
(58) Field of Search ........................... 360/53, 48, 55, 360/51, 31

(56) References Cited

U.S. PATENT DOCUMENTS

| | | | |
|---|---|---|---|
| 4,928,186 A | * | 5/1990 | Matsumoto et al. .......... 360/68 |
| 5,479,696 A | | 1/1996 | McNeil |
| 5,485,323 A | | 1/1996 | Anderson et al. |
| 5,668,680 A | | 9/1997 | Tremaine |
| 5,687,036 A | | 11/1997 | Kassab |
| 5,754,357 A | | 5/1998 | Anderson et al. |
| 5,999,352 A | | 12/1999 | Teck et al. |
| 6,091,559 A | * | 7/2000 | Emo et al. .................... 360/48 |
| 6,239,937 B1 | | 5/2001 | Troemel |

* cited by examiner

*Primary Examiner*—David Hudspeth
*Assistant Examiner*—Rocio Colon
(74) *Attorney, Agent, or Firm*—Westman, Champlin & Kelly

(57) ABSTRACT

A guardband portion is written on a disc surface in a disc drive. A predetermined data pattern is written on at least one data track adjacent to the guardband portion. A predetermined guardband pattern is written at a plurality of different guardband frequencies in the guardband portion. For each guardband frequency, at least one performance criterion is measured for the data track. A desired guardband pattern is written on the guardband portion of the disc surface at a guardband frequency chosen based on the measured performance criterion.

20 Claims, 3 Drawing Sheets

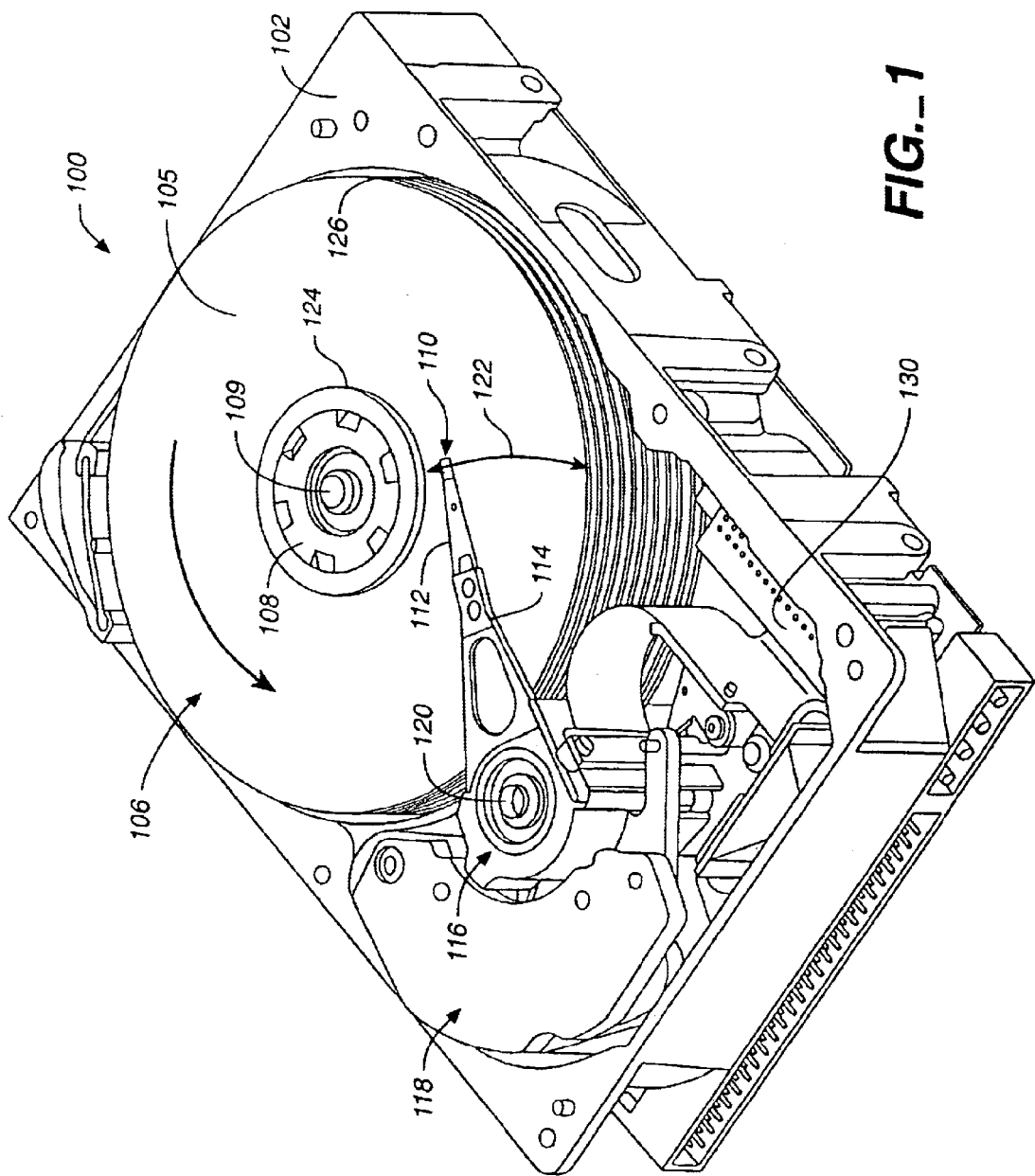
FIG._1

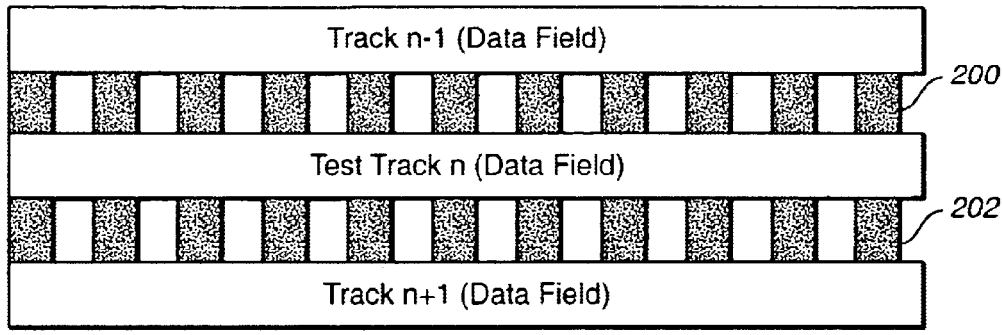
FIG._2
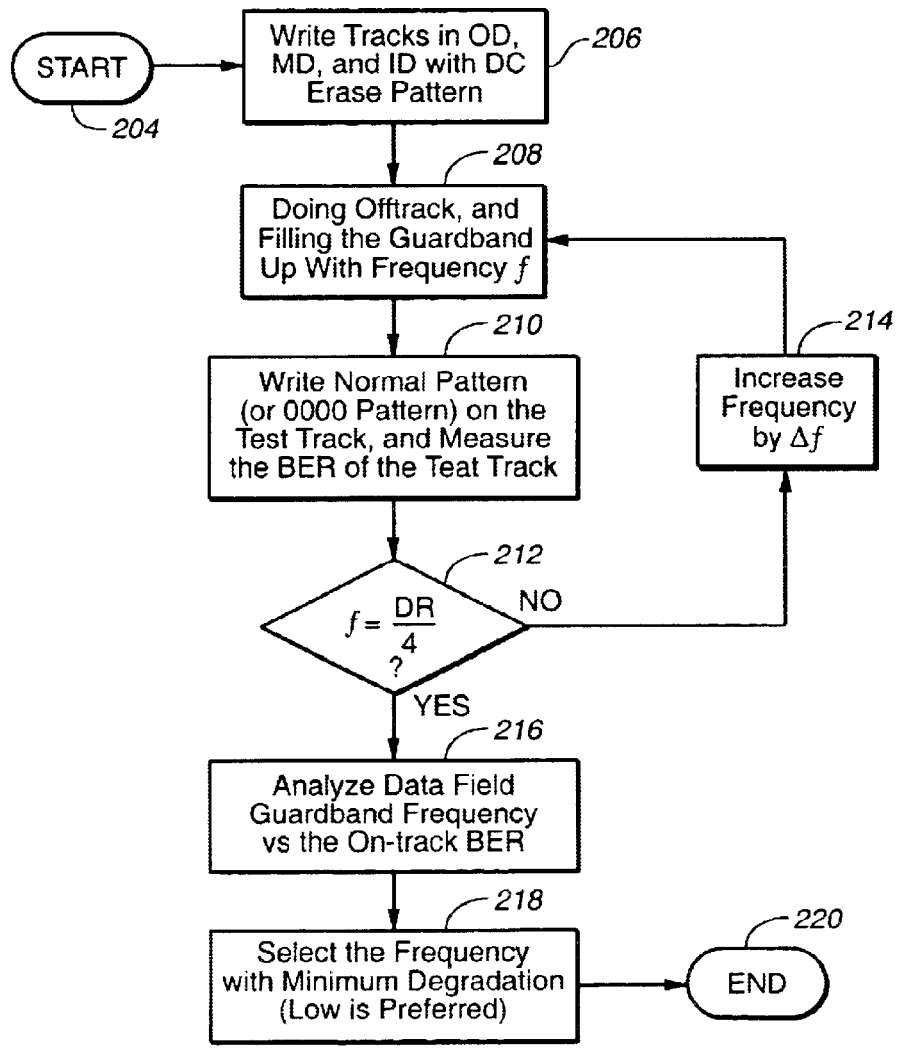
FIG._3

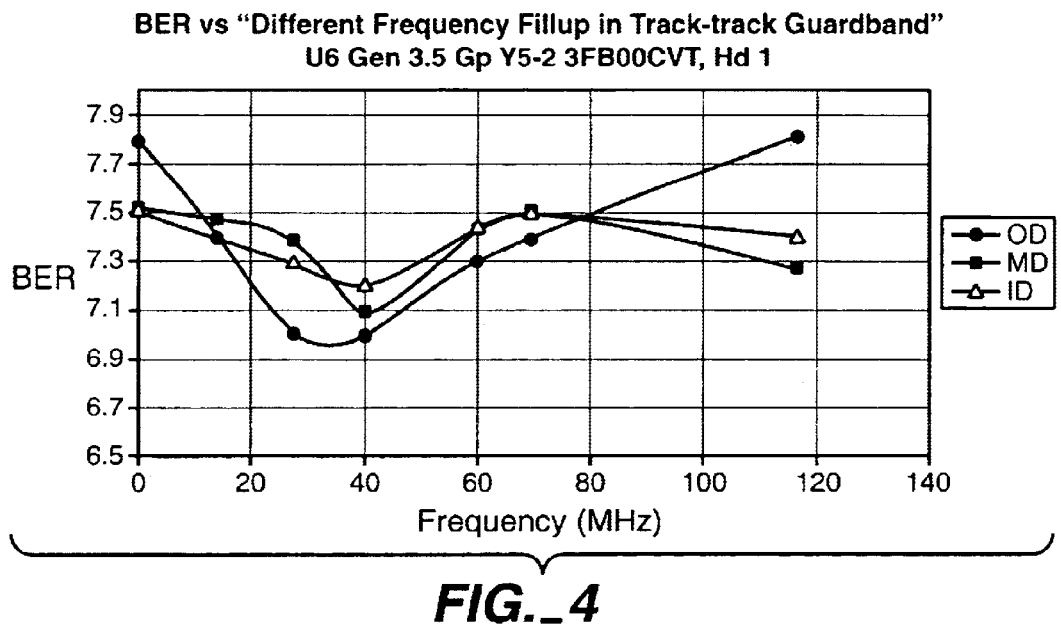
FIG._4
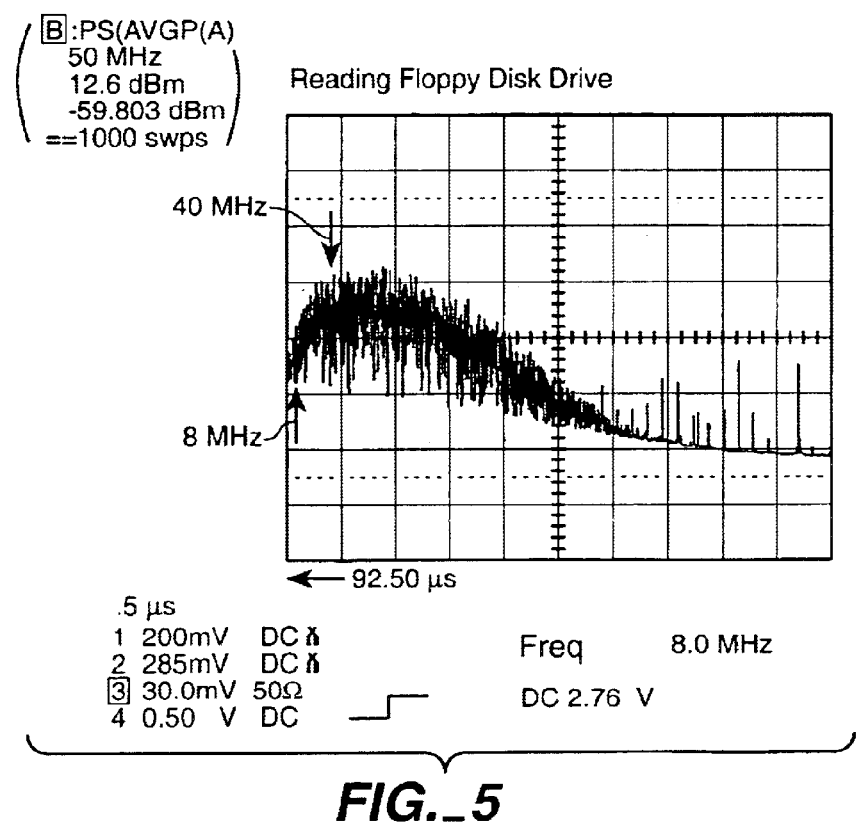
FIG._5

METHOD AND APPARATUS FOR DETERMINING DATA FIELD FILL-IN FREQUENCY AT SERVO PACK WRITING

CROSS-REFERENCE TO RELATED APPLICATION

The present invention claims priority from provisional U.S. Patent Application Ser. No. 60/286,805 entitled A NOVEL METHODOLOGY TO DETERMINE DATA FIELD FILL-IN FREQUENCY AT SERVO PACK WRITING, filed Apr. 26, 2001.

FIELD OF THE INVENTION

The present invention relates to disc drives. More specifically, the present invention relates to determining a data fill-in frequency used to write to a disc in a disc drive during servo writing.

BACKGROUND OF THE INVENTION

Disc drives illustratively include data transducers located relative to disc surfaces of rotatable discs in a disc stack. The data transducers are provided with a write signal to encode data on the disc surface. When the disc surface is moved relative to the data transducer, the data transducer generates a read signal indicative of data which has already been encoded on the disc.

In order to write data to the disc, a servo system is used to position the data head at one of a plurality of concentric tracks on the disc surface. A disc drive controller then provides information which generates the write signal that is provided to the data transducer. The data transducer thus encodes data on the disc surface at the desired track location.

When a read operation is to be performed, the servo system again positions the data transducer relative to a desired track on the disc surface. The data transducer then generates a read signal indicative of information encoded on the track over which the data transducer is positioned. This information is provided back to the drive controller which identifies data based on the read signal received.

It can thus be seen that, in order to perform a read or write, the servo system must perform a track following operation. In a track following operation, the servo system holds the data transducer over a track on the disc surface, while the disc rotates, to read data from, or write data to, the disc surface. In order to access a desired portion of the disc surface, the servo system must perform a track seek operation. In the track seek operation, the servo system moves the data transducer radially relative to the disc surface to a desired one of the concentric tracks to be accessed.

The data is stored in concentric tracks on each disc surface. The tracks are separated into various fields including a synchronization field, a field containing header information, a data field, etc. The concentric tracks on a given disc surface are separated from one another by a track-to-track guardband. In order to ensure correct track seeking or searching during the drive power-up process, a pattern with a predetermined frequency is written into the track-to-track guardband. Then, when a drive is powered up, the servo firmware first looks for the servo sectoring direct current (DC) field for synchronization and decodes the consecutive servo Gray code samples. However, if the track-to-track guardband is filled with, for example, a DC erase pattern, this pattern will misguide the data head to an incorrect track.

In some prior art disc drives, the guardbands on the media surfaces have been filled with a 40 MHz servo pattern. The guardband writing process is normally known as pack-writing. The data field is filled with a multi-frequency pattern. A certain degree of the guardband servo pattern frequency couples to the reader, causing some impact on the read back signal-to-noise ratio (SNR) in the data field. This causes the bit error rate (BER) at some zones to degrade by more than a decade.

The present invention addresses one or more of these deficiencies.

SUMMARY OF THE INVENTION

A guardband portion is written on a disc surface in a disc drive. A predetermined data pattern is written on at least one data track adjacent to the guardband portion. A predetermined guardband pattern is written at a plurality of different guardband frequencies in the guardband portion. For each guardband frequency, at least one performance criterion is measured for the data track. A desired guardband pattern is written on the guardband portion of the disc surface at a guardband frequency chosen based on the measured performance criterion.

These and various other features as well as advantages which characterize the present invention will be apparent upon reading of the following detailed description and review of the associated drawings.

BRIEF DESCRIPTION OF THE DRAWINGS

FIG. 1 illustrates a disc drive in accordance with one embodiment of the present invention.

FIG. 2 is an enlarged portion of a disc surface showing the track-to-track guardband as well as three data tracks.

FIG. 3 is a flow diagram illustrating one embodiment of determining a guardband frequency in accordance with the present invention.

FIG. 4 is a plot showing degradation in bit error rate (BER) versus different frequency patterns in the track-to-track guardband.

FIG. 5 is a graph illustrating data energy distribution at a track near an outer diameter of a disc surface.

DETAILED DESCRIPTION OF ILLUSTRATIVE EMBODIMENTS

FIG. 1 illustrates an embodiment of a disc drive storage device 100. Disc drive 100 includes a housing 102 that houses a disc pack 126 secured by clamps 124 to a spindle motor 108 and having storage surfaces 105 that are illustratively layers of material (such as magnetic material or optically readable material). The disc pack 126 includes a stack of multiple discs each accessible by a read/write assembly 112 which includes a transducer or head 110. Spindle motor 108 drives rotation of the discs in disc pack 126 in a direction of rotation about spindle 109. As discs 126 are rotated, read/write assembly 112 accesses different rotational locations on the storage surfaces 105 in disc pack 126. Read/write assembly 112 is actuated for radial movement relative to the disc surfaces, such as in a direction indicated by arrow 122, in order to access different tracks (or radial positions) on the disc surfaces. Such actuation of read/write assembly 112 is illustratively provided by a servo system which includes a voice coil motor (VCM) 118. Voice coil motor 118 includes a rotor 116 that pivots on axis 120. VCM 118 also illustratively includes an arm 114 that supports the read/write head assembly 112.

Disc drive 100 illustratively includes control circuitry 130 for controlling operation of disc drive 100 and for transferring data in and out of the disc drive 100.

Disc storage surfaces 105 are each illustratively composed of a plurality of concentrically arranged tracks. The tracks include a plurality of different fields, including a synchronization field, an index field, fields containing other header information, and a data field, etc. FIG. 2 shows that, in one embodiment, the data tracks (n−1, n and n+1 in FIG. 2) are concentrically separated by guardbands 200 and 202. Guardbands 200 and 202 may also illustratively be referred to as track-to-track guardbands 200 and 202.

To ensure correct track searching during the drive power-up process, guardbands 200 and 202 are written with a predetermined pattern having transitions written at a predetermined frequency. When the drive is powered up, the firmware in control circuitry 130 looks for a synchronization field referred to as a servo sectoring DC field for synchronization. The firmware decodes the consecutive servo Gray code recorded there. However, if guardbands 200 and 202 are filled with, for example, a direct current (DC) erase pattern, this may tend to misguide the data head to the wrong track.

In some prior drives, guardbands 200 and 202 were filled with a 40 MHz servo pattern and data fields n−1, n and n+1 were also filled with a pattern. This resulted in coupling of the guardband frequencies which caused a negative impact on the signal-to-noise ratio of the read back signal from the data fields. This tends to have a negative impact on bit error rate (BER) at some zones, and can cause them to degrade in excess of a full decade.

The present invention arises, at least in part, from a realization that it is important to select a correct data field guardband frequency at servo pack writing time in order to improve BER performance.

FIG. 3 is a flow chart illustrating one embodiment of choosing the guardband frequency in accordance with the present invention. In one illustrative embodiment, this methodology is applied in the early stages of drive development to determine the proper frequency to be used at servo pack writing.

Prior to implementing the methodology illustrated in FIG. 3, a lowest frequency is determined as the servo sectoring DC field frequency f. Having determined this frequency, in a known manner, three data tracks are first chosen. One is located at an outer diameter of the disc surface, another is located at a middle diameter and a third is located at an inner diameter. Each of these tracks is written with the DC erase pattern. This is indicated by blocks 204 and 206. Similarly, the head is moved off track and the guardband is also filled with the DC erase pattern at frequency f. This is indicated by block 208. This process serves to clean up regions with the DC erase pattern.

A normal pattern (or 000 pattern) is then written in the data field of the test track and is read back. The normal pattern is a multi-frequency pattern. A performance criterion, such as the BER is measured for the test track. This is indicated by block 210.

It is next determined whether the frequency f is the maximum or highest frequency desired. In one illustrative embodiment, frequency f is stepped up until it reaches the highest frequency of the channel chip in the zone containing the test track:

$$f = \frac{DR}{4};$$

where DR is the channel data rate of the zone containing the test track.

It is determined whether the frequency has reached the maximum frequency at block 212. If not, the frequency f is increased by a predetermined step Δ and the frequency of the pattern in the guardband is again written at the new frequency f. This is indicated by blocks 214 and 208.

If, at block 212, it is determined that the highest frequency desired to be written into the guardband has already been tried, then the data field guardband frequency versus the on-track BER are analyzed as indicated at block 216. The frequency which corresponds to a minimum degradation in BER is chosen. This is indicated by blocks 218 and 220. The guardband frequencies are then filled with the predetermined pattern at the selected frequency.

FIG. 4 illustrates one graph showing degradation in BER versus guardband pattern frequency. Three plots are shown, one for an outer diameter, one for a middle diameter and one for an inner diameter. FIG. 4 illustrates that, in general, an optimized BER performance is achievable by selecting f to be less than approximately 10 MHz or greater than approximately 80 MHz. Due to present day pack writer limitations, the data field guardband is illustratively located on the low side, such as 8 MHz, for example. FIG. 4 further illustrates that conventional disc drives, which commonly use a guardband frequency of 40 MHz, are not a good choice for the guardband frequency, because they cause nearly the largest deterioration or degradation in the BER. Instead, by using 8 MHz as the data field guardband frequency, a BER gain of approximately 1 decade is obtained at the outer diameter.

FIG. 5 is a graph of the data energy distribution of the outer diameter of the disc surface. FIG. 5 illustrates that one reason that 8 MHz results in a smaller deterioration in BER is that the 8 MHz frequency is further away from the major energy distribution on the outer diameter (such as at track 100).

Table 1 shows a comparison of overall BERs at the drive level with a 40 MHz data field fill-in guardband frequency at pack writing and with a 8 MHz data field fill-in guardband frequency at servo pack writing. The comparison was conducted for three different disc drives.

TABLE 1

|  | Head | 40 MHz | 8 MHz |
| --- | --- | --- | --- |
| Drive 1 | 0 | 6.5 | 7.8 |
|  | 1 | 5.4 | 6.9 |
| Drive 2 | 0 | 8.2 | 7.8 |
|  | 1 | 5.3 | 6.6 |
| Drive 3 | 0 | 5.4 | 6.3 |
|  | 1 | 6.1 | 7.1 |

It can be seen from table 1 that 8 MHz guardband frequency introduces an average BER improvement of approximately 1–2.3 decades for all heads. It can thus be seen that the present invention provides an easy and fast way to select a correct data fill-in guardband frequency at servo pack writing. The present invention can thus be used to increase, or optimize, BER performance across a disc surface.

It can thus be seen that the present invention can be implemented as a method of writing a guardband portion 200, 202 of a disc surface 105 in a disc drive 100. The method includes writing a predetermined data pattern on at least one data track (such as tracks n, n+1 or n−1) adjacent to the guardband portion 200, 202. The method further includes writing a predetermined guardband pattern at a plurality of different guardband frequencies in the guardband portion 200, 202. For each guardband frequency, a performance criterion (such as BER) is measured for the data track. A desired guardband pattern is then written on the guardband portion 200, 202 at a guardband frequency based on the measured performance criterion.

In accordance with one embodiment of the present invention, the bit error rate (BER) is measured by writing a test pattern in the data track (such as n, n−1 or n+1), reading the data track and calculating the bit error rate (BER) based on the test pattern written on track n and the data read.

In accordance with another embodiment, writing the desired guardband pattern at a guardband frequency (such as blocks 208–214) includes selecting the guardband frequency based on the measured bit error rate, and may specifically include selecting the guardband frequency corresponding to a measured bit error rate indicative of a best performance for the data track (such as n).

In one illustrative embodiment, the guardband frequency is selected such that it is less than approximately 10 MHz or greater than approximately 80 MHz, and may be approximately 8 MHz.

In accordance with another embodiment, the guardband pattern is written at a first guardband frequency and, after the corresponding bit error rate is measured on the data track, the guardband frequency is set to an increased frequency, greater than the first guardband frequency, and the guardband pattern is rewritten at the increased guardband frequency (such as in blocks 208, 210, 212, and 214).

In one embodiment, writing the guardband pattern at the first guardband frequency (such as block 208) includes writing the guardband pattern at a servo sector direct current (DC) field frequency and the steps of increasing the guardband frequency and rewriting the guardband pattern are repeated until the increased frequency reaches a desired maximum frequency, such as approximately one quarter of a channel data rate for data written on the adjacent data track n, n+1, n−1 (such as in block 212).

In another illustrative embodiment, these steps are repeated for a plurality of different concentric locations on the disc surface 105, such as an outer diameter, an inner diameter, and an intermediate diameter on a disc surface. See block 206.

The present invention can also be implemented as a data structure on a disc surface 105 including first and second concentric data tracks (n, n+1, or n−1) containing data written at a data frequency which may be a multi-frequency pattern, and a guardband portion (200, 202), concentrically separating, and adjacent to, the first and second data tracks, containing a guardband data pattern at a frequency of either no greater than 10 MHz or at least 80 MHz. The data structure can illustratively include the frequency of the guardband data pattern at approximately 8 MHz.

Similarly, the present invention can be implemented at a disc 106 in a disc drive 100, including data tracks, n, n+1, n−1 and guardband means concentrically adjacent to the data tracks for separating the data tracks. In one embodiment, the guardband means includes a data pattern written at a guardband frequency either no greater than approximately 10 MHz or at least 80 MHz, and may illustrative be 8 MHz.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. The preferred embodiment described herein is directed to a disc for a disc drive system, and it will be appreciated by those skilled in the art that the teachings of the present invention can be applied to systems, like optical or magnetic systems, without departing from the scope and spirit of the present invention.

What is claimed is:

1. A method comprising:
   (a) writing a data pattern on at least one data track of a data storage surface, wherein the data track is adjacent to a guardband portion of the data storage surface;
   (b) writing a guardband pattern at a plurality of different guardband frequencies in the guardband portion;
   (c) for at least one of the guardband frequencies, measuring at least one performance criterion for the data track; and
   (d) writing a desired guardband pattern on the guardband portion at a derived guardband frequency based on the measured performance criterion.

2. The method of claim 1 wherein measuring at least one performance criterion (c) comprises, for each of the guard band frequencies:
   (c1) measuring a bit error rate for the data track.

3. The method of claim 2 wherein measuring the bit error rate (c1) comprises:
   (c2) writing a test pattern in the data track;
   (c3) reading the data track; and
   (c4) calculating a bit error rate based on the test pattern written and the data read.

4. The method of claim 2 wherein writing the desired guardband pattern at the guardband frequency (d) comprises:
   (d1) selecting the guardband frequency based on the measured bit error rate.

5. The method of claim 4 wherein the measured bit error rate is indicative of a best performance for the data track.

6. The method of claim 5 wherein the selecting step (d1) comprises:
   (d2) selecting the guardband frequency as less than approximately 10 MHz.

7. The method of claim 5 wherein the selecting step (d1) comprises:
   (d2) selecting the guardband frequency as approximately 8 MHz.

8. The method of claim 5 wherein the selecting step (d1) comprises:
   (d2) selecting the guardband frequency as at least approximately 80 MHz.

9. The method of claim 1 wherein the writing step (d) comprises:
   (d1) writing the guardband pattern at a preliminary guardband frequency;
   (d2) after a bit error rate corresponding to the preliminary guardband frequency is measured, setting the guardband frequency to an increased guardband frequency greater than the preliminary guardband frequency; and
   (d3) rewriting the guardband pattern at the increased guardband frequency.

10. The method of claim 9 wherein the writing step (d1) comprises:
    (d4) using a servo sector direct current (DC) field frequency as the preliminary guardband frequency.

11. The method of claim 10 and further comprising: (e1) repeating steps (d2) and (d3) until the increased frequency reaches a maximum desired frequency.

12. The method of claim 10 wherein the repeating step (e1) comprises:
(e2) repeating steps (d2) and (d3) until the increased frequency reaches approximately one quarter of a channel data rate for data written on an adjacent data track.

13. The method of claim 1 and further comprising:
(f1) repeating steps (a)–(d) at a plurality of different radial locations on the data storage surface, wherein the data storage surface comprises a data storage disc.

14. The method of claim 13 wherein the repeating step (f1) comprises:
(f 2) repeating steps (a)–(d) at an outer diameter, an inner diameter and an intermediate diameter on the data storage surface, wherein the data storage surface comprises a data storage disc.

15. A data storage surface, comprising:
first and second data tracks comprising data written with a data pattern; and
a guardband portion separating and adjacent to the first and second data tracks, comprising a guardband pattern at a frequency that is based on at least one performance criterion measurement for the data tracks due to the frequency.

16. The data storage surface of claim 15 wherein the guardband frequency is either no greater than approximately 10 MHz or at least approximately 80 MHz.

17. A data storage surface comprising: data tracks;
guardband means positioned between the data tracks for delimiting the data tracks and having a guardband pattern written at a guardband frequency that is selected, based on a measured performance criterion for the data tracks due to the guardband frequency, for reducing interference with reading of the data tracks.

18. The data storage surface of claim 17 wherein the guardband frequency is either no greater than approximately 10 MHz or at least approximately 80 MHz.

19. The data storage surface of claim 18 wherein the guardband frequency comprises: approximately 8 MHz.

20. The data storage surface of claim 16 wherein the frequency of the guardband pattern is approximately 8 MHz.

* * * * *